127,552

UNITED STATES PATENT OFFICE.

JOHN L. BOONE, OF SAN FRANCISCO, CALIFORNIA.

IMPROVEMENT IN COMPOSITION POSTS FOR FENCES, TELEGRAPH-POLES, &c.

Specification forming part of Letters Patent No. 127,552, dated June 4, 1872.

SPECIFICATION.

*To all whom it may concern:*

Be it known that I, JOHN L. BOONE, of the city and county of San Francisco, State of California, have invented an Imperishable Post, of which the following is a specification:

My invention relates to an improved material for manufacturing fence and other equivalent posts, such as have one end buried or secured in the ground. My invention consists in manufacturing fence-posts, telegraph-posts, piles, and equivalent posts of heated asphaltum, either converted to a granular state and compressed into the desired shape in molds, or of some animal or vegetable fiber, which is saturated with asphaltum, either liquid or granulated, and afterward compressed in like manner. I prefer the latter method, as a post composed of fiber locked up in asphaltum will have the advantage of allowing nails to be driven into it to retain the boards which are nailed against it.

If a simple asphaltum post is used, dovetail grooves will have to be made in one side to receive the boards, as a nail will not readily penetrate the solid asphalt.

For fence-posts this artificial post will be quite valuable, as it will never decay, but a fence once built will stand until the boards wear out.

This post can be manufactured quite cheaply, especially in California, where asphaltum in inexhaustible quantities is found, and any fiber, animal or vegetable, can be used as a body for the post.

Having thus described my invention, what I claim, and desire to secure by Letters Patent, is—

Fence or equivalent posts either composed entirely of asphaltum, or mixed with an animal or vegetable fiber, and compressed into the desired shape, as a new article of manufacture.

In witness whereof I have hereunto set my hand and seal.

JOHN L. BOONE.

Witnesses:
 C. M. RICHARDSON,
 GEO. H. STRONG.